United States Patent Office 2,953,574
Patented Sept. 20, 1960

2,953,574

DYE COMPOSITIONS CONTAINING COBALT PHTHALOCYANINE PHENYL SULFONES

Tellis A. Martin, Evansville, Ind., assignor to General Aniline & Film Corporation, New York, N.Y., a corporation of Delaware No Drawing. Filed Dec. 29, 1953, Ser. No. 401,060

3 Claims. (Cl. 260—314.5)

This invention relates to dyeing compositions containing cobalt phthalocyanine phenyl sulfones and particularly to compositions consisting of mixtures of cobalt phthalocyanine and cobalt phthalocyanine containing from one to four phenylsulfonyl groups.

Metal phthalocyanines of the benzene series wherein one or all of the benzene nuclei contain quaternary or ternary salt groups attached to an aryl radical, which is bridged to the phthalocyanine nucleus by —S—, —SO$_2$— and the like, are well known. Such dyestuffs on vatting and dyeing show very poor fastness to chlorine. Demands have been made by textile colorists for metal phthalocyanines which are readily vattable and dye cotton in bright blue to greenish blue shades having improved chlorine fastness accompanied by excellent fastness to light and wash.

Vat dyeing compositions containing di(copper phthalocyanine) sulfone and compositions containing cobalt phthalocyanine in admixture with cobalt phthalocyanine containing hydrophilic substituents such as alkyl or aryl sulfonic, carboxylic, sulfonamide, or acrylamino groups are also known. While such dyes, upon vatting, yield blue to green, olive-green and grey shades, they do not, however, possess sufficient affinity for cotton and are not fast to chlorine.

I have found that a dye composition consisting of a mixture of cobalt phthalocyanine and cobalt phthalocyanine in which at least one of the benzene rings in the phthalocyanine dye is substituted by a substituted or unsubstituted phenylsulfonyl group yield compositions which upon vatting dye cotton fabrics yield bright blue to greenish blue shades and show excellent fastness to light, washing and improved fastness to chlorine. These unexpected and highly desirable properties are attributable to the presence of from 1 to 4 phenylsulfonyl groups in the benzene nuclei of the phthalocyanine dye in admixture with the cobalt phthalocyanine.

The cobalt phthalocyanines containing the substituted or unsubstituted phenylsulfonyl groups in said admixture are characterized by the following general formula:

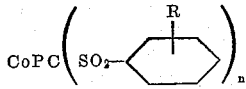

wherein R represents a halogen such as chlorine or bromine, hydrogen, lower alkyl, e.g., methyl, ethyl, etc., or a nitro group, n represents 1 to 4, and CoPC represents the molecule of cobalt phthalocyanine.

The mixture per se is characterized by the following general formula:

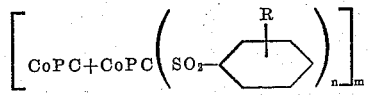

wherein CoPC, n and R have the same values as above, and m represents a numeral less than 1 and ranges from 0.1 to 0.8, preferably 0.2–0.4. It is to be noted, as will be shown in the following examples, that some chlorine atoms are introduced during the reaction of benzene sulfonyl chloride upon cobalt phthalocyanine. The degree of chlorination, however, appears to have little effect with the exception of a slight shift toward the green. The affinity for fiber of such a mixture containing chlorinated phthalocyanines is highly surprising and unexpected since chlorinated cobalt phthalocyanine derivatives exhibit very poor affinity for fiber.

The mixture of cobalt phthalocyanine dyes characterized by the above general formula are prepared by (a) the reaction of a benzene sulfonyl chloride upon cobalt phthalocyanine or (b) by the reaction of cobalt phthalocyanine sulfonyl chloride and either benzene, halogenated benzene, or alkylated benzene. An excess of the benzene sulfonyl chloride or the benzene or benzene derivative is employed. These two reactions are best effected by heating the co-reactants in a suitable solvent, such as, dichlorobenzene, trichlorobenzene, nitrobenzene, and the like, in the presence of a catalyst such as, aluminum chloride, ferric chloride, antimony chloride and the like, at a temperature ranging from 80–190° C. for a period of time of one to ten hours. In some cases, particularly for reaction (b) an excess of the benzene or substituted benzene may serve as a solvent. In either case the product is isolated by one of the following methods: (1) If the product has precipitated from the solvent, it may be collected on a filter, washed first with ethanol and then with water, and dried. (2) The reaction mixture may be diluted with ethanol to precipitate the product, or (3) the solvent may be removed by steam and then collected on a filter as (1) above. Finally the dried products are made into a paste by solution in sulfuric acid, pouring into ice-water, filtering, washing acid-free, and sieving (200 mesh) the aqueous paste.

The benzene sulfonyl chlorides may be prepared by the usual methods: i.e., by the action of (a) chlorosulfonic acid upon the benzene or substituted benzene or (b) phosphorus pentachloride upon the sodium or potassium salt of benzene sulfonic acids.

The cobalt phthalocyanine sulfonyl chlorides may be prepared by heating (at 80–105° C.) CoPC with chlorosulfonic acid or by the action of phosphorus pentachloride upon the sodium or potassium salt of cobalt phthalocyanine sulfonic acids.

The mixture of vat dyes prepared by the foregoing procedures possesses excellent affinity for cotton and exhibits unusual good tinctorial strength. The dyeings of fabrics are of bright blue to greenish-blue shades which show excellent fastness to light and washing, and are superior in wash and chlorine fastness to the cobalt phthalocyanine containing the aforementioned hydrophilic group substituents.

The following examples describe in detail the methods for preparing the mixture of dyestuffs for the present invention. It is to be understood, however, that the following examples are inserted solely for the purpose of illustration and are not to be construed as being limitative. All parts given are by weight unless otherwise specified.

*Example 1*

A mixture of 15 grams of cobalt phthalocyanine, 150 ml. of dry dichlorobenzene, 80 ml. of benzene sulfonyl chloride and 5 grams of antimony trichloride was heated (protected from any atmospheric moisture by a CaCl$_2$ drying tube) at 170–180° C. for four hours. When cool the reaction mixture was diluted with 200 ml. of ethanol, filtered, washed first with ethanol and then with water, and dried in an oven at 80° C.; 16 grams of crude solid. It was purified and made into a paste by dissolving the pulverized material in 200 ml. of concentrated sulfuric acid, pouring into ice-water, filtering, washing acid free, heating the wet cake with one liter of 2% sodium hydroxide for one hour, filtering, washing with warm water, and converting the wet cake into an aqueous paste. The dyestuff contains 3.73% chlorine and 3.09% sulfur which corresponds to approximately one phenylsulfonyl and one chlorine atom per cobalt phthalocyanine molecule. This dyestuff vats, according to one of the standard methods (IN, 60° C.) for vat dyes, and dyes cotton in bright blue shades with excellent fastness to light (102 hours, only a slight break) and wash and improved chlorine fastness.

From the average number of phenylsulfonyl groups and chlorine atoms present, this product may be written as cobalt mono-phenylsulfonyl-mono-chloro-phthalocyanine. However, it is believed to consist of a mixture of (1) 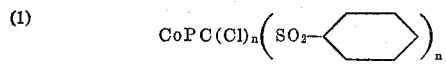

(2) 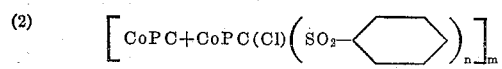

and (3) 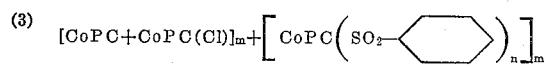

where $m=0.1$ to $0.8$ and where $n=1$ to $4$.

It is to be noted that the degree of substitution ($n$) may be very readily controlled to some extent by varying the quantities of the co-reactants and the reaction conditions, as will be noted in Example 4.

*Example 2*

To a stirred mixture of 12 grams of cobalt phthalocyanine, 200 ml. of dry nitrobenzene and 15 ml. of benzene sulfonyl chloride was added 15 grams of anhydrous aluminum chloride. The reaction mixture was stirred and heated at 140–150° C. for one hour. On cooling, the precipitated product was collected on a funnel, washed with ethanol and stirred for one hour with 326 grams of 8% sulfuric acid. The suspended material was collected on a filter, washed and dried; 14.5 grams. This material consists chiefly of mono(phenyl sulfonyl) cobalt phthalocyanine. Small amounts of chlorine are also present. An aqueous paste was prepared according to the directions given in Example 1. It was found to be a trifle weaker than the dyestuff prepared in Example 1; however, the dyeings were equal (trace bluer) in light, wash fastness and chlorine.

*Example 3*

A mixture of 15 grams of cobalt phthalocyanine, 150 ml. of dry dichlorobenzene, 100 grams of 4-toluene sulfonyl chloride and 4 grams of antimony trichloride was heated with mechanical stirring for two hours at 170–180° C. The product was isolated by removing the solvent with steam, filtering, washing and drying; 9.5 grams of solid which consists chiefly of chlorinated tetra(4-tolyl sulfonyl) cobalt phthalocyanine. A paste was prepared as in Example 1. It vats and dyes cotton in bright greenish-blue shades which exhibit good fastness properties to light, chlorine and wash.

*Example 4*

A mechanical stirred mixture of 15 grams of cobalt phthalocyanine, 200 ml. of dry trichlorobenzene, 78 grams of 4-chlorobenzene sulfonyl chloride and 6 grams of antimony trichloride was heated at 180–190° C. for six hours. The dyestuff was isolated and made into a paste according to the directions given in Example 1. The dyestuff contains 2.27% of chlorine and 0.74% sulfur. It vats and dyes cotton in bright greenish-blue shades with excellent fastness properties. From the average number of phenylsulfonyl groups and chlorine atoms present, this dyestuff may be represented as a mixture of (1) 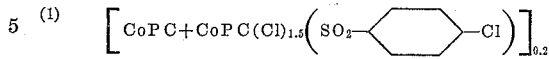

and (2) 

When larger amounts of the sulfonyl chloride were employed or higher reaction temperatures used, the product consisted of a mixture, containing large amounts of the mono(phenyl sulfonyl) derivative and small amounts of the di(phenyl sulfonyl) derivatives. This material vats readily and dyes cotton in bright blue shades with good fastness. It also possesses excellent tinctorial strength.

*Example 5*

214 parts of chlorosulfonic acid was added slowly at 20–30° C. under mechanical stirring to 51.3 parts of fluorobenzene. The reaction mixture was stirred at 40–50° C. for one hour and then poured slowly onto 500 parts of chipped ice. This intermediate, 4-fluorobenzene sulfonyl chloride, was extracted with 191 parts of carbon tetrachloride. The solvent was removed under reduced pressure and the residual oily material was dissolved in 392 parts of dry dichlorobenzene. A mixture, consisting of this solution, 6 parts of antimony trichloride and 12 parts of cobalt phthalocyanine, was stirred and heated at 160–170° C. for four hours. When cool the precipitated dyestuff was collected on a filter, washed with ethanol and water. The wet filter cake was purified by heating with 300 parts of 5% sodium hydroxide, filtering and washing neutral; 140 parts (7.2%) of dyestuff paste. This product was found to contain 2.12% chlorine, 0.86% fluorine, and 1.51% sulphur. Thus from the average number of fluorophenylsulfonyl groups and chlorine atoms, this dyestuff may be represented as a mixture of:

(1) 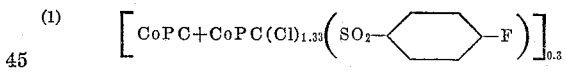

and (2) 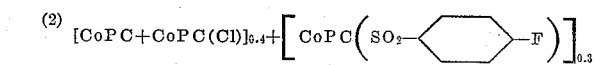

This dyestuff yields an olive green vat from which cotton is dyed in strong bright blue shades that are very fast to light chlorine and wash.

*Example 6*

Instead of the 78 grams of 4-chlorobenzene sulfonyl chloride employed in Example 4, there are used 85 grams of 3-nitrobenzene sulfonyl chloride. The resulting material consists chiefly of the chlorinated tetra(3-nitrophenyl sulfonyl) derivative. It vats (reducing the $NO_2$ groups to the $NH_2$) and dyes cotton in bright greenish-blue shades.

*Example 7*

A mixture of 10 grams of cobalt phthalocyanine disulfonyl chloride, 300 ml. of toluene and 6 grams of antimony trichloride was heated at 110–115° C. for eight hours. This dyestuff was found to be similar to that prepared in Example 3 (somewhat bluer). It consists of the di(tolyl sulfonyl) derivative. Only small amounts of chlorine were present.

All of the foregoing dyes are of brilliant blue to brilliant greenish-blue shades of excellent fastness to light, washing and chlorine. When compared with competitive type, such as the products of U.S.P. 2,613,128 they possess improved wash and chlorine fastness.

While I have disclosed the preferred embodiment of my invention, it will be readily appreciated by those skilled in the art that many changes and variations may be made therein without departing from the invention thereof. The scope of the invention will be amended solely by the appended claims.

I claim:

1. A phthalocyanine dye composition comprising a mixture of cobalt phthalocyanine and a phenylsulfonylated cobalt phthalocyanine having the formula:

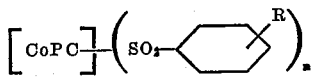

wherein R represents a member selected from the group consisting of chlorine, bromine, fluorine, hydrogen, lower alkyl and nitro groups, CoPC represents the molecule of cobalt phthalocyanine, $n$ represents the value of 1 to 4 and the amount of the phenylsulfonylated cobalt phthalocyanine ranging from 0.1 to 0.8 mole per mole of cobalt phthalocyanine.

2. A phthalocyanine dye composition according to claim 1 wherein the mixture consists of:

(1)

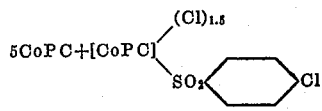

and (2)

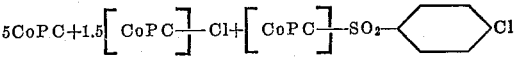

wherein CoPC represents the molecule of cobalt phthalocyanine.

3. A phthalocyanine dye composition according to claim 1 wherein the mixture consists of:

(1)

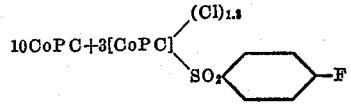

and (2)

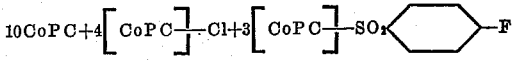

wherein CoPC represents the molecule of cobalt phthalocyanine.

References Cited in the file of this patent

UNITED STATES PATENTS

| | | |
|---|---|---|
| 2,414,374 | Haddock et al. | Jan. 14, 1947 |
| 2,416,386 | Haddock et al. | Feb. 25, 1947 |
| 2,479,491 | Haddock et al. | Aug. 16, 1949 |
| 2,613,128 | Baumann et al. | Oct. 7, 1952 |

FOREIGN PATENTS

| | | |
|---|---|---|
| 2,681,344 | France | June 15, 1954 |